United States Patent [19]

Porowski et al.

[11] Patent Number: 5,185,123
[45] Date of Patent: Feb. 9, 1993

[54] APPARATUS FOR ANNEALING WALLS OF NUCLEAR REACTORS

[76] Inventors: Jan S. Porowski; Edward J. Hampton; Manohar L. Badlani; William J. O'Donnell, all of 241 Curry Hollow Rd., Pittsburgh, Pa. 15236

[21] Appl. No.: 866,412

[22] Filed: Apr. 10, 1992

[51] Int. Cl.⁵ .............................................. G21C 19/00
[52] U.S. Cl. ...................................... 376/277; 266/251
[58] Field of Search ............... 376/247, 249, 277, 260, 376/463; 266/251, 252; 148/516, 712; 29/723

[56] References Cited
U.S. PATENT DOCUMENTS 4,652,423 3/1987 DeWitt et al. ...................... 376/277
5,025,129 6/1991 Miller et al. ........................ 376/247
5,064,173 11/1991 Ecalle et al. ....................... 266/252
5,116,026 5/1992 Bauer et al. ........................ 148/516

Primary Examiner—Daniel D. Wasil
Attorney, Agent, or Firm—Joseph J. Carducci

[57] ABSTRACT

Apparatus suitable for annealing the interior walls of a nuclear reactor which comprises a nuclear reactor shell, a cap securely attached to the nuclear reactor shell, wherein the cap has an inlet line for the introduction of a hot gas under high pressure and an outlet line for removing low pressure gas from the interior of the apparatus, means, such as a cylindrical shell, that helps define an annular space adjacent to the vertical walls of the reactor through which gas can flow and means for directing low pressure gas to the outlet line.

10 Claims, 3 Drawing Sheets

APPARATUS FOR ANNEALING WALLS OF NUCLEAR REACTORS

BACKGROUND OF THE INVENTION

1. Field of the Inventions

This invention relates to apparatus suitable for annealing the interior walls of a nuclear reactor, particularly the vertical walls thereof, including the weld material in said walls, wherein said nuclear reactor is provided with a cap securely attached at the top thereof, said cap having a high-energy gas inlet extending inwardly therein and a low-energy gas outlet extending outwardly therefrom, means defining an annular space adjacent to the vertical walls of said reactor through which gas can flow and means for directing low energy gas to said low-energy gas outlet.

2. Description of the Prior Art

During the normal operation of a nuclear reactor, fast neutrons emanating from the core of the reactor create irradiation damage in the walls of the reactor, as well as in the weld material, resulting in the embrittlement of the metal, thereby reducing the metal toughness thereof. It is known that some, or all of the irradiated metal, can be restored to its initial, preoperational state by subjecting the same to elevated temperatures, for example, 423° F. to 650° F., for about 168 hours. It is known that a "wet" annealing process has been carried out on Belgian nuclear reactors with hot water at a relatively low temperature of about 262° to about 650° F. In *Feasibility of and Methodology for Thermal Annealing an Embrittled Reactor Vessel* (EPRI NP-2712, Volume 2, Project 1021-1, Final Report, November 1982, pages S-5 and S-6) it is stated that wet annealing at the relatively low temperatures will result in relatively low recovery of the reactor, but that "dry" thermal annealing, that is, without liquid in the reactor, using spent fuel assemblies, induction heating elements or resistance heating elements at temperatures on the order or about 850° F. for about 168 hours, recovery of the embrittled walls is on the order of about 80 to about 100 percent. Means for carrying out a dry annealing process of the type described is illustrated in *Report on Annealing of the Novovoranezh Unit Reactor Vessel in the USSR* prepared by N. M. Cole and T. Fridericks for the U. S. Nuclear Regulatory Commission. On page 15, it is stated that for such purpose, there was used annealing L apparatus having a weight of 28.7 tons and carrying 54 heating panels distributed on the periphery thereof.

Using hot water in a nuclear reactor to reach an effective annealing temperature of about 850° F. is virtually impossible, since the pressure required in the water at such high temperature would be so high as to seriously impair the structural integrity of the reactor walls. Normally, the water temperatures in a nuclear reactor cannot be raised above about 645° F. Although it is possible to reach an effective annealing temperature of about 850° F. using heating elements, as illustrated above in the Russian reactor system, all of the reactor, including the thermal shields therein, have first to be removed, the heating assembly is extremely large and expensive and it would be difficult to heat the reactor walls uniformly throughout, because it is likely that some portions of the wall heated by adjacent heating elements would have zones there-between that would not receive as much heat energy as the main heated portions, resulting in nonuniform heating of the walls.

Using the novel apparatus disclosed and claimed herein requires only simple alterations in the reactor to be treated, is simple to operate and will result in reactor walls that have been substantially completely heated to at any desired temperature level, for example, during the preheating stage as well as during the annealing stage.

SUMMARY OF THE INVENTION

We have discovered an apparatus suitable for annealing the interior walls of a nuclear reactor which comprises a nuclear reactor shell, a cap securely attached thereto, said cap having a high-energy gas inlet extending inwardly therein and a low-energy gas outlet extending outwardly therefrom, means defining an annular space adjacent the vertical walls of said reactor through which gas can flow and means for directing low-energy gas to said low-energy gas outlet.

BRIEF DESCRIPTION OF THE INVENTION

Figure 1:
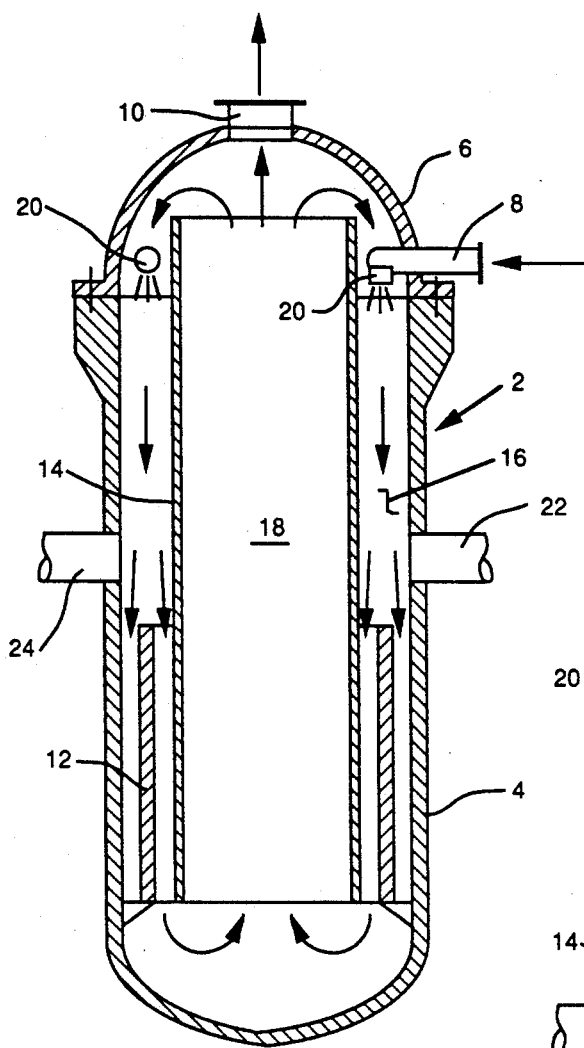
FIG. 1 is a schematic drawing of apparatus provided with means defining an annular space adjacent to the reactor walls and means for directing gas downwardly through such annular space.
Figure 2:
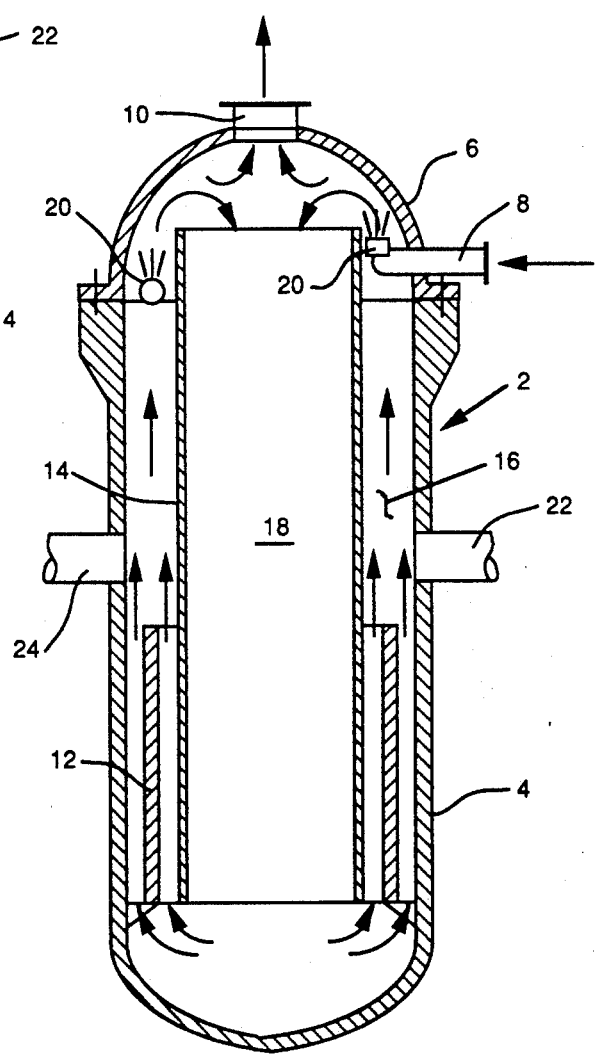
FIG. 2 is a schematic drawing illustrating a modification of the apparatus of FIG. 1 wherein means is shown for directing gas upwardly through the annular space.

Referring to the drawings, reference numeral 2 refers to the novel apparatus defined and claimed herein comprising a nuclear reactor shell 4 and cap 6, replacing the normal reactor head, securely attached to nuclear reactor shell 4, by any suitable means, for example, using bolts, therefor. Cap 6 is provided with at least one high-energy (that is, high pressure) inlet line 8, preferably a large number, circumferentially spaced within cap 6, and at least one low-energy (that is, low pressure) outlet line 10. In the embodiment illustrated in FIG. 1, the fuel supports and water normally present in a nuclear reactor have been removed, but the thermal shield 12 has not. If desired, however, the thermal shield can also be removed, for its presence does not appreciably alter the functional validity of the novel apparatus. As shown in FIGS. 1 and 2, the apparatus is provided with a shell 14, preferably cylindrical, that together with the adjacent inner wall of nuclear reactor shell 4 defines an annular space 16 that permits flow of gas therethrough in contact with practically all of inner wall of said nuclear reactor shell 4. The cylindrical shell 14 can be mounted (by any conventional means, not shown) to the cap 6, the nuclear reactor shell 4, or both, in a manner such that the desired gas flow is not impeded or altered in annular space 16, shell core 18 or therebetween.

The apparatus shown in FIG. 1 is assembled as follows. The reactor that is to be subjected to the annealing process is shut down, drained of its liquid water content, and the reactor head, the reactor fuel, the reactor core structure and the thermal shield, if desired, removed therefrom following, for example, standard refueling procedures. The cap 6 is then securely attached to nuclear reactor shell 4.

In using the apparatus shown in FIG. 1, the first stage requires heating the reactor walls to a temperature of about 850° F. gradually over a period of time, for example, by introducing a hot gas into the reactor by inlet line 8, circulating the hot gas through the reactor, introducing additional hot gas to maintain the desired temperature therein and removing an approximately equal amount of gas from outlet line 10 to that introduced in inlet line 8 for maintaining the temperature therein. Heating to the desired annealing temperature is preferably done at the rate of about 20° to about 50° F. per hour.

During the annealing stage, the hot gas, such as steam, air, nitrogen, etc., is then introduced into apparatus 2 by means of inlet line 8 at a temperature of about 850° to about 900° F. and a pressure of about 100 to about 1000 psig and is passed downwardly through annular space 16. Injection of said high-pressure gas into the reactor provides sufficient energy to maintain circulation of the gas in the annular space at a rate of about 60 to about 150 feet per second. In a preferred embodiment, the gas from inlet line 8 is distributed through a header 20 into the annular space 16. The annular space 16 has a width of about three to about eight inches.

The hot gases move downwardly and then upwardly through shell core 18 having a diameter of about nine to about 12 feet. Most of the gases moving upwardly are recycled and mixed with incoming gases from line 8 before they pass downwardly through annular space 16. The incoming gas helps maintain the desired temperature in the reactor. The amount of gas leaving outlet 10 is approximately equal to the incoming gas in line 8. No appreciable loss of circulating gas occurs through inlet/outlet lines 22 and 24 present in nuclear reactor shell 4, because the pressure in said lines is approximately the same as the pressure in the annular space 16.

In order to provide unimpeded cyclic flow of gas in the nuclear reactor, the length of the cylindrical shell 14 is approximately equal to the vertical dimension of the nuclear reactor shell and the vertical portion of cap 6.

In a typical apparatus herein, the temperature of the gas in the reactor during the annealing process is approximately 850° C., the pressure in the range of about 0 to about 100 psig. The total amount of gas circulating in the apparatus during steady state operation will amount to about 20 to about 25 tons hour and the amount of gas entering and leaving will amount to about 10 to about 25 weight percent thereof. At the end of about 168 hours, annealing operations cease and the nuclear reactor walls will revert substantially to their preirradiated stage.

The assembly is then brought to ambient temperature and pressure gradually over a period of time in any suitable manner. For example, gases or liquid are circulated through the assembly such that cooling from annealing conditions to ambient conditions is carried out at the rate of about 20° to about 50° F. per hour.

The novel apparatus illustrated in FIG. 2 is similar to that of FIG. 1 except that the gases from header 20 are ejected upwardly to cause circulation of the gases downwardly through shell core 18 and then upwardly through annular space 16 in contact with the adjacent walls of the reactor.

Figure 3:
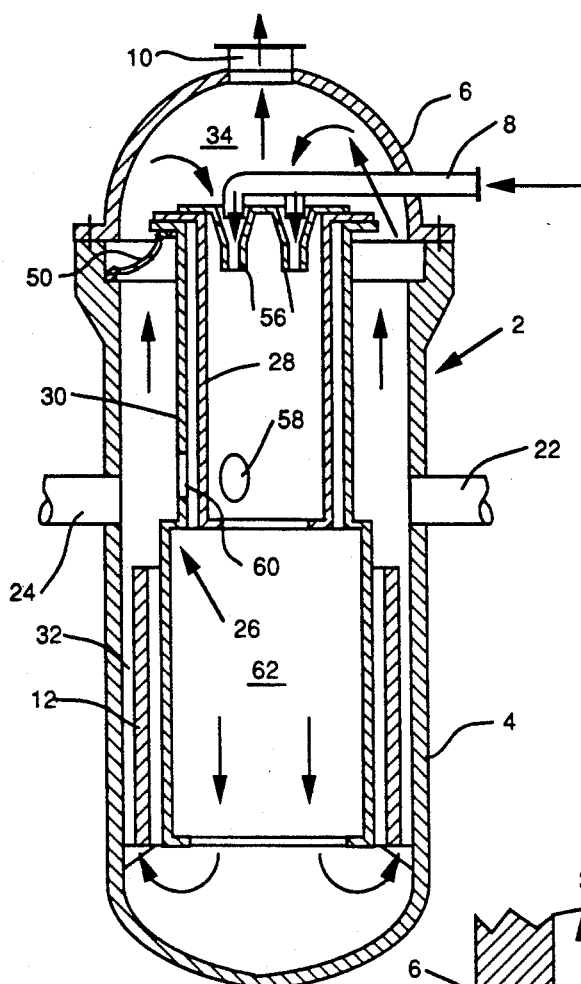
FIG. 3 is a schematic drawing showing a further modification of the apparatus herein, wherein the core supports are maintained in the reactor space providing means for directing the flow of gas therein.

The apparatus of FIG. 3 is similar to those described above in FIGS. 1 and 2, except that cylindrical shell 14 is not used. Instead, the normal core support assembly 26, comprising an upper core support 28 and a lower core support 30, present in a nuclear reactor, is not removed but is used to help define an annular space 32 adjacent to the walls of the reactor for movement of gas therethrough. In order to so use the core supports 28 and 30, which are cylindrical shells, it is first necessary to raise the core support assembly 26 to permit communication of gas between the annular space 32 between the core support assembly 26 and the space 34 within cap 6.

Figure 4:
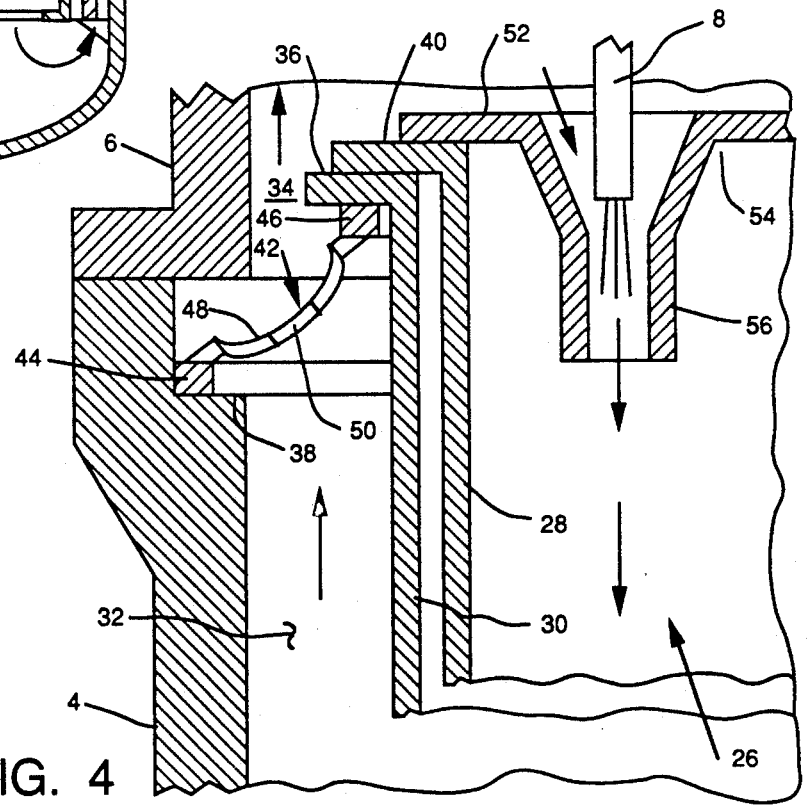
FIG. 4 is a schematic drawing of a portion of the embodiment of FIG. 3 showing the means used to enable use of the core support for directing flow of gas in the reactor.

This can be illustrated in FIG. 4, wherein normally lower core support 30 is supported in the nuclear reactor 4 by horizontal portion 36 thereof lying on circumferential ledge 38 of nuclear reactor shell 4 and upper core support 28 is supported on horizontal portion 36 by means of horizontal member 40 thereof. The core support assembly 26 can be maintained in raised position, for example, using a circumferential assembly 42, preferably split into at least two circumferential parts, comprising a lower circumferential ring 44, an upper circumferential ring 46 and an inclined connecting member 48 provided with sufficient openings 50 to permit movement of gas therethrough, positioned between the core support assembly 26 and circumferential ledge 38, thereby permitting communication between space 34 in cap 6 and annular space 32.

Resting on horizontal position 40 is a circular plate 52 provided with sufficient openings 54 therein in which there are preferably disposed eductors, preferably of a venturi type 56 into which inlet lines 8 can discharge gases therethrough.

Normally, as shown in FIG. 3, the lower core support 30 has openings 60 communicating with inlet-outlet lines 22 and 24 and with openings 58 in upper core support 28 to permit flow of gases therethrough. In order to substantially reduce bypass flow of gas in annular space 32 through said normally aligned openings 60 and 58, upper and lower core supports 28 and 30, respectively are rotated, relative to each other, until openings 60 and 58 are no longer in aligned position.

During operation of the apparatus illustrated in FIG. 3, high energy gas is introduced into the apparatus 2 by line 8, passes downwardly into and through eductors 56, when used, into core space 62 and then upwardly through annular space 32. A large amount of the gases is recycled through eductor 56 and a portion thereof, substantially equivalent to the amount of gases introduced in line 8, is removed from the system through line 10. This flow is continued, for example, for 168 hours while maintaining the temperature of the reactor wall at about 850° F.

Figure 5:
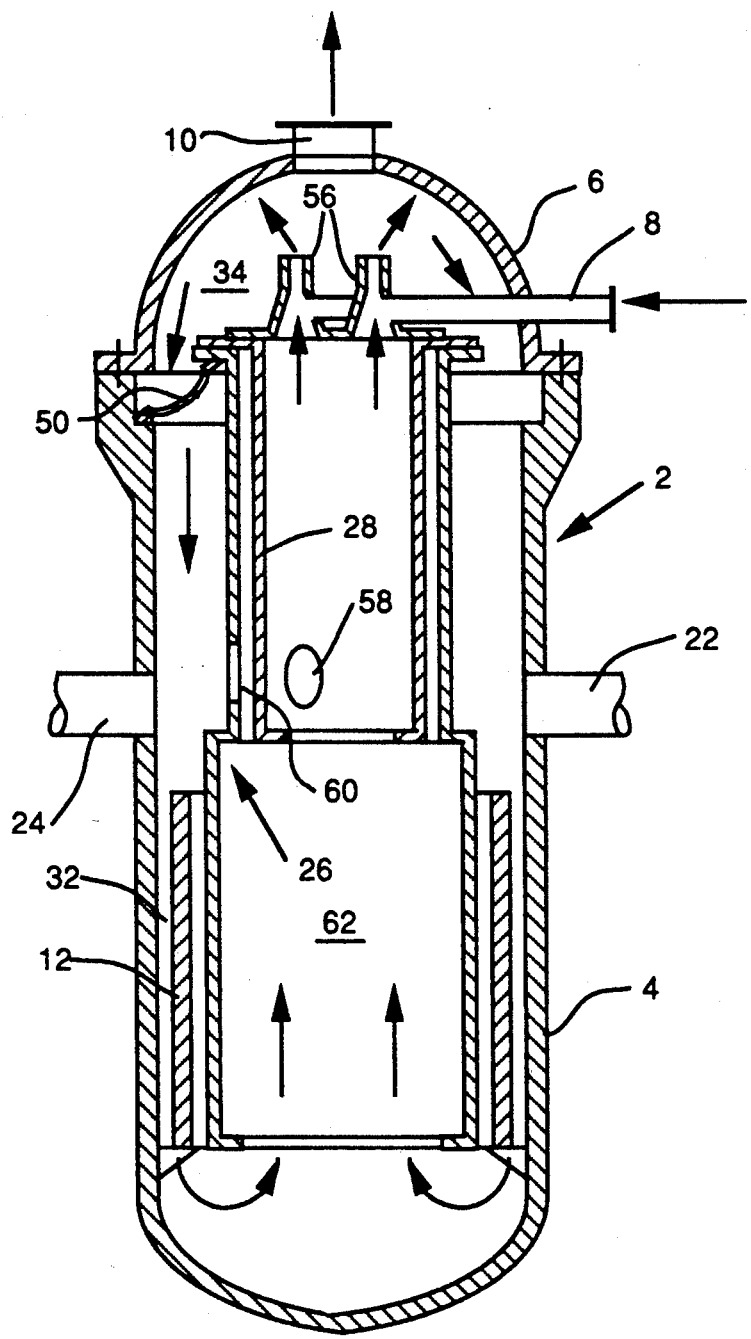
FIG. 5 is a schematic drawing similar to FIG. 3 but an embodiment for altering the flow of gas within the reactor.

The novel apparatus illustrated in FIG. 5 is similar to that described in FIGS. 3 and 4 except that the incoming gases in line 8 are initially directed upwardly into space 34 in cap 6, downwardly through annular space 32, upwardly through core space 62, recirculating a larger portion of the gases and then removing a smaller portion thereof through outlet line 10.

Since in each of the embodiments herein, the hot gases are at a temperature of 850° F., and above, if needed, are maintained in uniform contact with the walls of the reactor, the walls are uniformly and completely heated to the desired temperature, resulting in reactor walls that are substantially returned to their normal, preirradiated state.

In a typical operation herein, using the apparatus of FIG. 1 as an example therefor, and assuming steady state condition during the annealing process, five tons per hour of steam at a temperature of 900° F. and a pressure of 800 psig are passed through an inlet pipe 8 having an inner diameter of six inches through a eductor 56, as shown in FIG. 3 having a throat diameter of three inches and a diffuser outlet diameter of 24 inches. After leaving the eductor, the gases leaving the eductor in admixture with recycled gas, have a temperature of about 910° F. and a pressure of 30 psig and are moved through an annular space having an average width of six inches at a rate of about 120 feet per second and then upwardly through the shell core having a diameter of 10 feet. The circulation rate of gas in the apparatus amounts to about 25 tons, of which about 1/5 is continuously removed from the apparatus through outlet line 10, with a remainder being recycled as shown in FIG. 1. This procedure is continued for 168 hours while maintaining the temperature nuclear reactor shell 4 at 850° throughout this period.

Obviously, many modifications and variations of the invention, as hereinabove set forth, can be made without departing from the spirit as scope thereof, and therefore only such limitations should be imposed as are indicated in the appended claims.

We claim:

1. Apparatus suitable for annealing the interior walls of a nuclear reactor, which comprises a nuclear reactor shell, a cap securely attached thereto, said cap having at least one high-energy gas inlet extending inwardly therein and a low-energy gas outlet extending outwardly therefrom, means defining an annular space adjacent vertical walls of said reactor through which gas can flow and means for directing a portion of low-energy gas to said low-energy gas outlet.

2. The apparatus of claim 1 wherein said means for defining said annular space comprises an elongated cylindrical shell vertically disposed in said nuclear reactor and open at the ends thereof, thereby permitting passage of gases through the core thereof.

3. The apparatus of claim 2 wherein said high-energy gas inlet extends into a header.

4. The apparatus of claim 3 wherein said header extends downwardly to inject gases into said annular space.

5. The apparatus of claim 3 wherein said header into said core.

6. The apparatus of claim 1 wherein said means for defining said annular space comprises a nuclear reactor core support.

7. The apparatus of claim 6 wherein said core support comprises an upper core support portion thereof having at least one opening in the wall thereof and a lower core support portion thereof having at least one opening in the wall thereof, said openings in said core supports being out of alignment with each other.

8. The apparatus of claim 7 wherein said high-energy gas inlet extends into an eductor.

9. The apparatus of claim 7 wherein said eductor injects gas downwardly into said annular space.

10. The apparatus of claim 7 wherein said eductor injects gas into said core.

* * * * *